United States Patent [19]

Post

[11] Patent Number: 5,783,885
[45] Date of Patent: Jul. 21, 1998

[54] SELF-ADJUSTING MAGNETIC BEARING SYSTEMS

[75] Inventor: Richard F. Post, Walnut Creek, Calif.

[73] Assignee: The Regents of the University of California, Oakland, Calif.

[21] Appl. No.: 511,981

[22] Filed: Aug. 7, 1995

[51] Int. Cl.⁶ .............. H02K 7/09; H02K 7/06; H02K 49/00
[52] U.S. Cl. .............. 310/90.5; 310/80; 310/103; 310/105
[58] Field of Search .............. 310/90.5, 103, 310/105, 80, 104

[56] References Cited

U.S. PATENT DOCUMENTS

| | | | |
|---|---|---|---|
| 3,611,815 | 10/1971 | Fischell | 74/5.7 |
| 3,779,618 | 12/1973 | Soglia et al. | 310/90.5 |
| 3,845,997 | 11/1974 | Boden et al. | 308/10 |
| 3,877,761 | 4/1975 | Boden et al. | 308/10 |
| 3,929,390 | 12/1975 | Simpson | 310/90.5 |
| 3,976,339 | 8/1976 | Sabnis | 310/90.5 |
| 4,043,614 | 8/1977 | Lyman | 308/10 |
| 4,090,745 | 5/1978 | Dohogne et al. | 310/90.5 |
| 4,398,773 | 8/1983 | Boden et al. | 308/10 |
| 4,405,286 | 9/1983 | Studer | 417/1 |
| 4,585,282 | 4/1986 | Bosley | 310/90.5 |
| 4,620,752 | 11/1986 | Fremerey et al. | 310/90.5 |
| 5,331,819 | 7/1994 | Matsuda et al. | 62/51.1 |
| 5,386,166 | 1/1995 | Reimer et al. | 310/90.5 |
| 5,495,221 | 2/1996 | Post | 335/299 |
| 5,563,565 | 10/1996 | Hull | 335/216 |

*Primary Examiner*—Steve L. Stephan
*Assistant Examiner*—Michael J. Wallace, Jr.
*Attorney, Agent, or Firm*—John P. Wooldridge

[57] ABSTRACT

A self-adjusting magnetic bearing automatically adjusts the parameters of an axially unstable magnetic bearing such that its force balance is maintained near the point of metastable equilibrium. Complete stabilization can be obtained with the application of weak restoring forces either from a mechanical bearing (running at near-zero load, thus with reduced wear) or from the action of residual eddy currents in a snubber bearing. In one embodiment, a torque is generated by the approach of a slotted pole to a conducting plate. The torque actuates an assembly which varies the position of a magnetic shunt to change the force exerted by the bearing. Another embodiment achieves axial stabilization by sensing vertical displacements in a suspended bearing element, and using this information in an electrical servo system. In a third embodiment, as a rotating eddy current exciter approaches a stationary bearing, it heats a thermostat which actuates an assembly to weaken the attractive force between the two bearing elements. An improved version of an electromechanical battery utilizing the designs of the various embodiments is described.

30 Claims, 3 Drawing Sheets

5,783,885

SELF-ADJUSTING MAGNETIC BEARING SYSTEMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to magnetic bearings, and more specifically, it relates to magnetic bearings that are intrinsically radially stable and are automatically stabilized axially.

2. Description of Related Art

U.S. Pat. No. 4,043,614 discloses a magnetic suspension system for efficiently supporting a rotor of relatively large radius and high available moment of inertia. It includes concentric stator and rotor elements spaced apart by narrow gaps of relatively large diameter and very small axial extent. A pair of spaced discs in the stator are oppositely polarized by a permanent magnet, their peripheral magnetic field strength being selectively augmented or diminished in predetermined sectors by electromagnet windings thereon. The rotor includes narrow ring faces juxtaposed to said discs and a permanent magnetic polarization being provided between the narrow ring faces. Means are provided for varying the relative electromagnetic contributions in the different sectors to maintain stability of rotor positioning with minimized electric power.

U.S. Pat. No. 3,877,761 provides a contact-free bearing system for radially supporting a rotor, rotatable at high speed, with respect to a stationary member. It comprises a magnetic system including electromagnetic bearings. The electromagnetic bearings includes an endless ferromagnetic core carrying a spiral or toroidal winding which includes or acts as at least three separate coils. Electrical signals, dependent upon the radial deviation in the position of the rotor from a predetermined position are applied to said winding such that the coils produce magnetic fields which are applied to the rotor and are of different magnitude or direction.

U.S. Pat. No. 3,845,997 provides a magnetic bearing assembly for journalling a rotor which is at least partly ferromagnetic in a stator, the bearing assembly being able to absorb transverse forces acting on the rotor. The assembly includes radial bearing means holding the rotor on a desired axis of rotation and at least one magnet. An air gap is defined between the rotor and the magnet in which a magnetic field is set up. The magnetic field has a first magnetic field component which is constant around the periphery of the air gap and on which is superimposed a second magnetic field component which varies around the periphery of the air gap to absorb the transverse forces.

SUMMARY OF THE INVENTION

It is an object of the present invention to provide self adjusting magnetic bearings.

It is also an object of the present invention to minimize the losses in a self-adjusting magnetic bearing such that the force equilibrium position of a suspended element is at the point where the repulsive force is minimal, so that eddy-current induced forces need only preserve stability in the close vicinity of the position of vertical force equilibrium.

An automatic means for adjusting the parameters of an axially unstable magnetic bearing is provided. The force balance of the magnetic bearing is maintained near the point of metastable equilibrium where complete stabilization can be obtained with the application of weak restoring forces, either from a mechanical bearing or from the action of residual eddy currents in a snubber bearing.

In a first embodiment, a repulsive force is generated by the approach of a slotted pole surface to a conducting plate (or a conducting cylinder). Eddy currents thus generated will also generate a torque in the conducting plate, with a magnitude that is proportional to the force of repulsion. The torque is used to actuate an upper assembly to rotate about a drive screw to vary the position of a magnetic shunt pair within the magnetic bearing. This shunt then changes the force exerted by the bearing until it approaches a position of force equilibrium. The eddy current-driven actuator thus performs a similar function to the electronic feedback circuits used in "active" magnetic bearings to maintain the bearing at the point of metastable equilibrium.

A second embodiment achieves axial stabilization through a simplified electrical servo system. A detached pole assembly facilitates the stabilization of a rotor against transverse "whirl" instabilities through the use of damping and/or spring-like elements that support that assembly. That same element is used as a sensor for vertical displacements away from equilibrium of the lower bearing element that supports the rotor. A vertical displacement, up or down, of the lower pole element will be reflected in a change in the force balance on the intermediate pole element. This change may result in a vertical displacement of that element, acting against supporting spring-like elements. This displacement can then be sensed, and used in an electronic feedback loop to maintain a stable equilibrium.

In a third embodiment, a rotating eddy current exciter induces heat in a stationary eddy current plate. The heat causes a thermostat element to expand which weakens the levitational force between a stationary and a rotatable bearing element. The design is made such that the net resultant of the attraction and of the repulsion, taken together with the weight that is being supported (e.g., the rotor of an electromechanical battery) is a state of vertical force equilibrium. It is further arranged, by geometry, and, if indicated, by the use of the "reduced derivative" concept that the position of vertical force equilibrium is a stable one.

A vibration damper is disclosed for use in high-speed rotating systems, particularly ones that use magnetic bearings such as the ones described herein. In such systems it is common to use what are called "eddy-current dampers" in which a stationary conducting plate (copper, for example) is located close to the surface of a rotating annular permanent magnet. This magnet is often an integral part of the magnetic bearing system itself.

Incorporating the designs of the disclosed embodiments, an improved version of a type of modular electromechanical (EM) battery is described. This much-simplified version is particularly well suited for stationary applications, where low cost, high reliability, and long service life are the critical parameters. This version involves a major change in the magnetic bearing design, particularly its elements within the vacuum chamber. This change in bearing design results in an overall design that permits the simplification of all the elements of the EM battery that operate within the vacuum housing.

DETAILED DESCRIPTION OF THE INVENTION

The invention is an automatic means for adjusting the parameters of an axially unstable magnetic bearing such that its force balance is maintained near the point of metastable equilibrium, at which point complete stabilization can be obtained with the application of only weak restoring forces, either from a mechanical bearing (running at near-zero load, thus with reduced wear) or from the action of residual eddy currents in a snubber bearing. Generally, this self-adjusting magnetic bearing is intrinsically radially stable and has a stationary bearing element and a rotatable bearing element that is magnetically levitated by the stationary bearing element. The bearing includes a means for automatically adjusting the magnetic parameters of the stationary bearing element with respect to the rotatable bearing element to provide axial stability, such that the force balance of the self-adjusting magnetic bearing is maintained near the point of metastable equilibrium.

Figure 1:
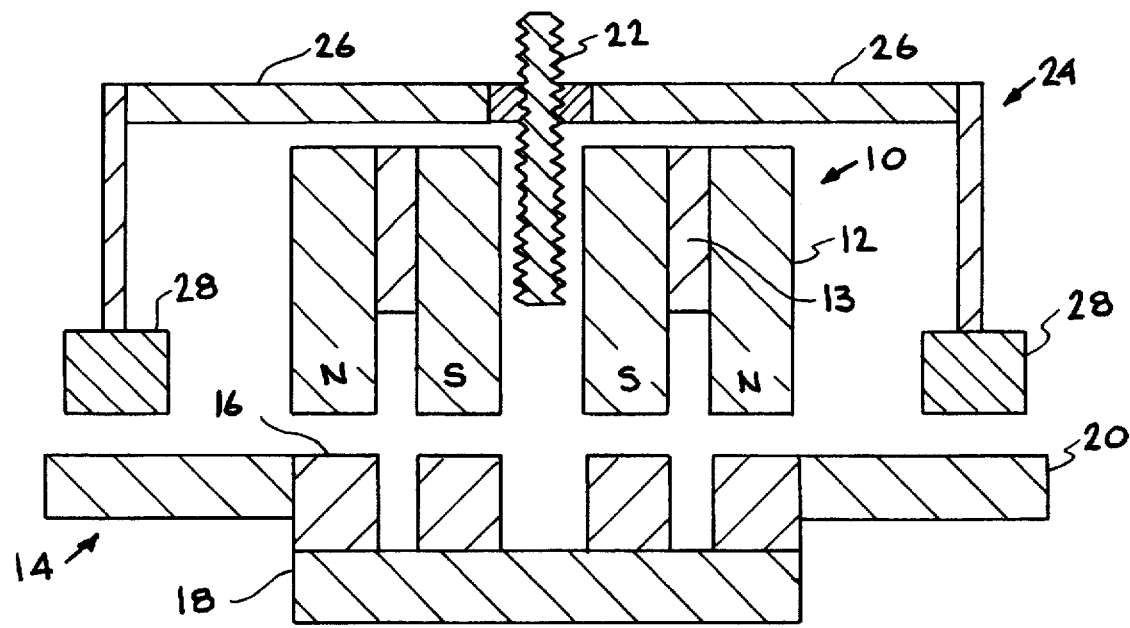
FIG. 1 shows an embodiment using eddy currents to drive a shunt assembly.

Referring to the cross sectional view shown in FIG. 1, an annular stationary bearing element 10 comprising annular iron pole pieces 12 is attached to a support structure (not shown). Annular pole pieces 12 are separated with permanent magnet material 13. A generally disc shaped rotatable bearing element 14 is magnetically levitated by the stationary bearing element 10. Rotatable element 14 comprises annular iron pole pieces 16 which are attached to a rotatable disc 18. Pole pieces 16 are located directly across from the iron pole pieces 12 of the stationary element 10. Pole pieces 12 and pole pieces 16 are selected to exert magnetically attractive forces upon each other so that rotatable bearing element 14 tends to be pulled toward stationary upper bearing element 10. An annular conducting plate 20 is attached to the outer annular pole piece 16 of the rotatable bearing element 14. In this embodiment, the conducting plate 20 is made of copper, but may be made of any non-magnetic electrically conductive material. A stationary drive screw 22 is attached to a supporting structure (not shown), and supports a rotatable assembly 24, which has an internal thread which matches the thread of stationary drive screw 22. Rotatable assembly 24 comprises a shunt pair 26 and a slotted pole pair 28 or a planar Halbach array 28. Rotatable bearing element 14 typically supports a rotor and is rotated by a drive mechanism (not shown).

In operation, a repulsive force is generated by the approach of slotted pole surface 28 to conducting plate (or a conducting cylinder) 20. Eddy currents thus generated will also generate a torque in the conducting plate 20, with a magnitude that is proportional to the force of repulsion. The torque is used to actuate rotatable assembly 24 to rotate about drive screw 22 to vary the position of the magnetic shunt pair 26 within the permanent-magnet-excited magnetic bearing. This shunt then weakens (or strengthens) the force exerted by the bearing until it approaches a position of force equilibrium, i.e. a position of metastable equilibrium. In this action the eddy current-driven actuator performs a similar function to the electronic feedback circuits used in "active" magnetic bearings to maintain the bearing at the point of metastable equilibrium.

It should be recognized that the residual repulsive force from eddy currents exerted by a snubber bearing itself can be used to insure a stable equilibrium. The self-adjusting action can be used to insure that the energy losses and heating effects associated with those eddy currents are automatically reduced to a minimal value, since with proper design the system will always drive itself to a position of vanishing torque on the actuator, and thus to vanishingly small eddy-current losses.

Referring again to FIG. 1, the shunt pair 26 is only actuated in a direction to weaken the field, that is, it would drive the lifting force down only. This would be acceptable if the magnetic bearing had excess lifting capacity that would only need a one-time adjustment to bring the force down to near-equilibrium (as in stationary applications, for example). For systems where one would need both positive and negative excursions about equilibrium, one would employ a more complicated drive system, i.e. one with eddy current discs on both upper and lower sides of the azimuthally segmented poles (or vice-versa). In such an embodiment, drive screw 22 is hollow. A second eddy current disc is then located above the shunt pair. This second eddy current disc is supported by a drive shaft that is fixedly connected to the rotating disc 18. The drive shaft passes through the hollow drive screw 22 to connect the rotating disc to the second eddy current disc. A second pair of slotted pole pieces or a planar Halbach array pair are attached with a reversing gear to the shunt pair 26. In operation, as eddy current plate 20 approaches slotted pole pair 28, a torque is induced which drives the shunt pair 26 down to a position closer to annular pole pieces 12, thus reducing the attractive force exerted by annular pole pieces 12 on annular pole pieces 16, allowing the rotatable bearing element 14 to move away from the stationary bearing element 10. As the rotatable bearing element 14 moves away from the stationary bearing element 10, a point is reached where the force exerted by the second eddy current plate on the second slotted pole pair exceeds the force exerted by the eddy current plate 20 on the slotted pole pair 28, thus driving the shunt pair 26 away from annular pole pieces 12. This causes the force exerted by annular pole piece 12 on annular pole piece 16 to increase, thus driving the system to a new position of force equilibrium.

Figure 2:
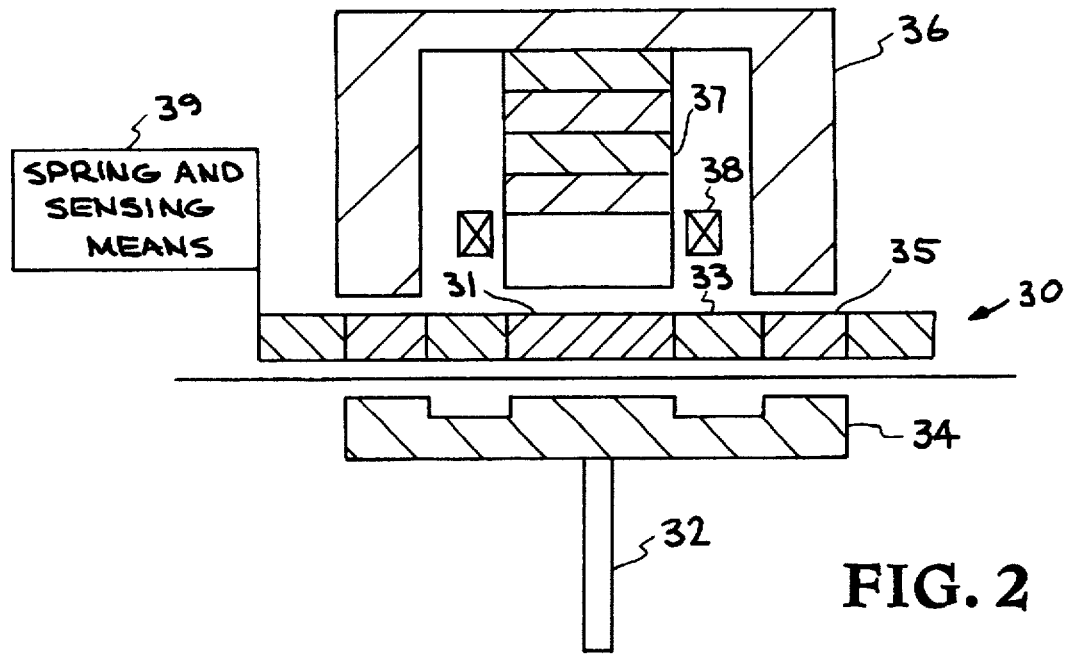
FIG. 2 shows an embodiment using the position or strain on an intermediate pole assembly to drive a control coil.

A second embodiment, shown in the cross-sectional view of FIG. 2, presents another means for achieving axial stabilization, accomplished through a much-simplified electrical servo system. A detached pole assembly 30 facilitates the stabilization of the rotor 32 against transverse "whirl" instabilities through the use of damping and/or spring-like elements 39 that support that assembly. Detached pole assembly 30 is used as a sensor for vertical displacements away from equilibrium of the bearing element 34 that supports the rotor. A vertical displacement, up or down, of the lower pole element 34 will be reflected in a change in the force balance on the detached pole assembly 30. This change may result in a vertical displacement of the detached pole assembly 30, acting against supporting spring-like elements.

This displacement can then be sensed, and used in an electronic feedback loop to maintain a stable equilibrium. If the springs are reasonably compliant, this sensing might be accomplished simply through the change in electrical capacity between the detached pole assembly 30 and its surroundings (the stationary bearing element 36, and/or a chamber wall). Alternatively, if the supporting spring elements are very stiff in the axial direction then the change in force on the detached pole assembly 30 associated with a vertical displacement of the lower bearing element 34 could be sensed by resistive-type strain gauge elements.

The self-adjusting magnetic bearing shown in FIG. 2 has a stationary cup shaped element 36 having a central axis and an interior magnetic bearing element 37 with a pole having permanent magnet material. Magnetic bearing element 37 is fixedly attached to the central axis of the stationary cup shaped element 36. The rotatable bearing element 34 may be an of iron disc. In this embodiment, the means for automatically adjusting the magnetic parameters comprise the detached pole assembly 30 located between the stationary bearing element 36 and the rotatable bearing element 34. The detached pole assembly 30 is a disc with a center iron piece 31 and at least one alternating concentric ring of non-magnetic metal 33 and iron 35. Detached pole assembly 30 is attached to a support structure with a spring 39 (shown in box form) with means for sensing vertical displacements away from equilibrium of the rotatable bearing element 34. Control coil 38 surrounds the interior magnetic bearing element 37 and a feed-back circuit (not shown) is electrically connected between the means for sensing vertical displacements 39 and the control coil 38.

The use of a reduced-derivative design in the stationary bearing element 36, together with the slow response of a rotor 32 to the acceleration of gravity (in the vicinity of force equilibrium), has a favorable impact on the design of the electronic servo circuitry. Because of this slow response, the servo system need have only a very limited frequency response (bandwidths of a few tens of Hertz). Thus, very simple and inexpensive components should be adequate, and in most cases it should not be necessary to laminate the iron in the magnet poles, thus reducing their cost. The upper bearing element 36 may be located above and outside of a vacuum chamber wall 40, so that the magnetic attractive forces are exerted through the chamber wall itself.

Figure 3A:
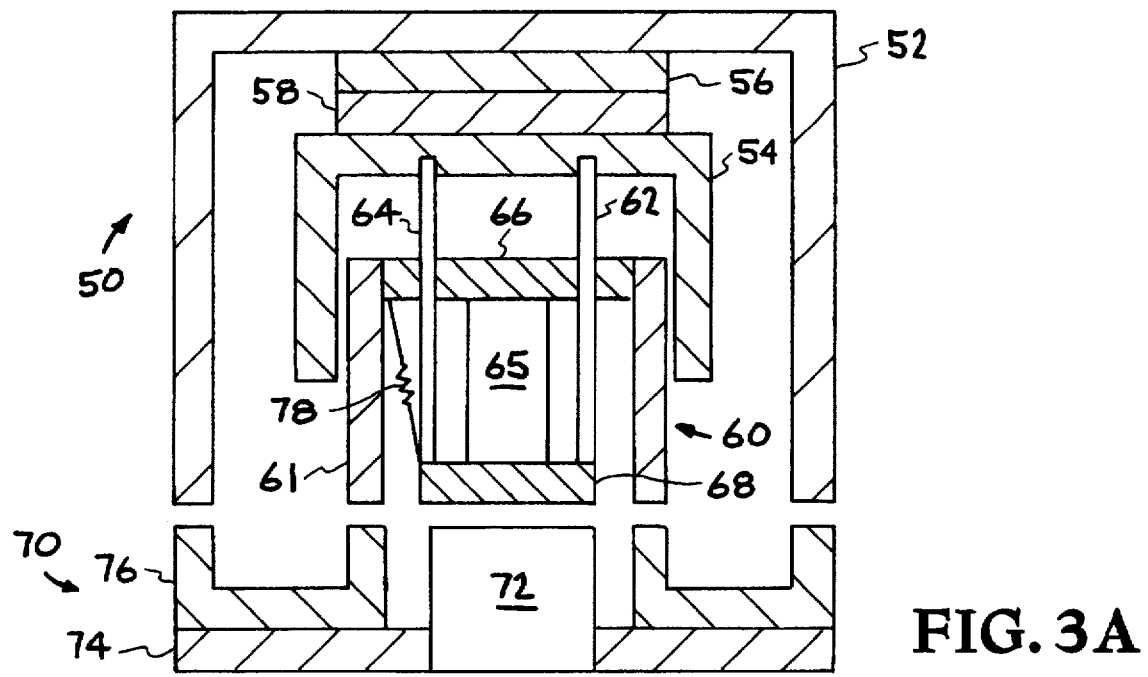
FIG. 3A shows a thermally controlled self-adjusting magnetic bearing.
Figure 3B:
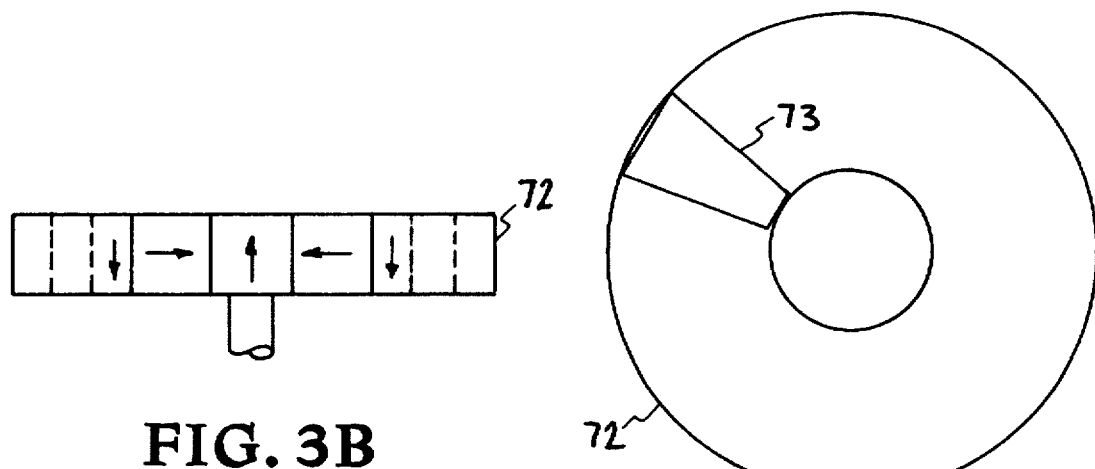
FIG. 3B shows the relative rotation of magnetization of an eddy current exciter in a Halbach array configuration for use in an embodiment of the thermally controlled self-adjusting magnetic bearing of FIG. 3A.
Figure 3C:
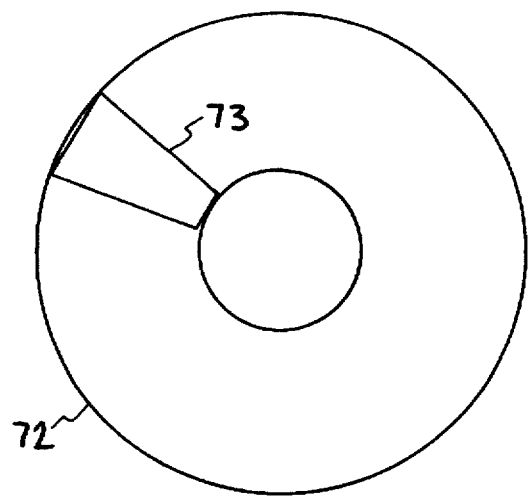
FIG. 3C shows a top view of a Halbach eddy current exciter with a representative pie shaped magnet piece for use in an embodiment of the thermally controlled self-adjusting magnetic bearing of FIG. 3A.

FIG. 3A shows a sectional view of a thermally adjusting magnetic bearing. Stationary bearing element 50 comprises a cup shaped element 52 made of magnetically conducting material such as iron. Another cup shaped element 54 of stationary element 50 also comprises magnetically conducting material. A permanent magnet piece 58 is connected between the first cup 52 the second cup 54. A non-magnetic metallic piece 56 such as aluminum may be included between the two cup shaped elements 52 and 54. Another cup shaped element 60 made of magnetically conducting material 61 and non-magnetic metallic material 66 with two through holes is nested within cup shaped element 54. An eddy current plate 68 is supported by two support rods 62, 64 that extend from the eddy current plate 68 through the two through holes and are fixedly attached to the cup shaped element 54. Rotatable bearing element 70 is has an eddy current exciter 72 an a pole assembly 76 fixedly attached thereto. The means for automatically adjusting the magnetic parameters comprise a thermostat element 65 supported between the eddy current plate 68 and the non-magnetic metallic material 66 of cup shaped element 54. The eddy current exciter 72 may be a slotted pole or a Halbach array, as shown in FIGS. 3B and 3C. Thermostat element 65 may be a sealed sylphon bellows with a vaporizable liquid or element 65 may be an assembly having a bimetallic element. At least one tension spring 78 may be fixedly attached between the cup shaped element 60 and the eddy current plate 68. Rotatable bearing element 70 is generally disc shaped and may have an annular aluminum disc 74 attached thereto. Annular poles 76 may be attached to disc 74. Rotatable bearing element 70 is magnetically levitated by stationary bearing element 50, due to a magnetically attractive relationship therebetween.

In FIG. 3, the rotating eddy current exciter 72 exerts a repelling force (in opposition to the attractive force of the upper poles) on the stationary eddy current plate 68. The design is made such that the net resultant of the attraction and of the repulsion, taken together with the weight that is being supported (e.g., the rotor of an electromechanical battery) is a state of vertical force equilibrium. It is further arranged, by geometry, and, if indicated, by the use of the "reduced derivative" concept that the position of vertical force equilibrium is a stable one. FIG. 3B shows the relative rotation of magnetization of an eddy current exciter 72 in a Halbach array configuration. FIG. 3C shows a top view of a Halbach eddy current exciter with a representative pie shaped magnet piece 73.

Because the force derivative in the transverse direction of the eddy current plate/eddy current exciter system can be made to be small by design, whereas the force derivative in the transverse direction of the attractive bearing is strong and in the stable (centering) direction, the combination of the two represents a passively stable system. This stability will be maintained over a finite range of vertical displacements (as dictated by the particular design) as long as the (stabilizing) force derivative of the eddy current elements is larger than the destabilizing force derivative of the magnetic bearing, and the resultant vertical force equals the downward gravitational force on the suspended mass.

By weakening the attractive force of the stationary bearing element 50, for example by an adjustment to the strength of the permanent magnet 54, a widening of the gap between the stationary element 50 and the rotatable element 70 will result, which in turn will result in a decrease in the repulsive force on the eddy current exciter 72, leading to a new and stable position of force equilibrium. But it can also be readily seen that the amount of power dissipated in the eddy current plate 68 is thus reduced, so that the power losses of eddy current origin in the bearing system are reduced.

Note now that when the rotating eddy current exciter 72 is positioned close to the surface of the eddy current plate 68, heat will be generated in the eddy current plate 68, causing the thermostat element 65 to expand vertically, stretching springs 78. Since the eddy current plate 68 is restrained in position by the support rods 62 and 64, the expansion of the thermostat element 65 necessarily results in an upward motion of the movable pole of cup shaped element 60. This motion in turn weakens the attractive force of the upper stationary poles of stationary element 50 on the lower rotating poles of rotatable element 70, resulting in a lowering of the rotating parts to a new equilibrium position, one in which the heating is less. With care in the design the end result is that the eddy current losses are minimized, while still maintaining a stable equilibrium, both axially and radially.

It may turn out to be advantageous to have a similar (but not necessarily identical) bearing assembly located lower down on the rotor, so that the position of force equilibrium is one that is determined by the vector sum of both bearing forces, taken together with the supported mass. In this case the design should be such as to locate the force equilibrium position of the two magnetic pole systems at a point where the amount of oppositely acting eddy current (repulsive) force is minimal, so that the eddy-current-induced forces need only to preserve stability in the close vicinity of the position of vertical force equilibrium.

It is not necessary that the system described be absolutely stable in the steady-state sense. If the condition on the vertical force derivative is satisfied over a reasonable range, then the system might slowly oscillate vertically with small amplitude, on a thermal time scale (i.e. minutes) without seriously affecting the operation of the system. The system described herein is much simpler to implement, and reliable compared to most "active" magnetic bearings (using sensors and electronic servo circuits) that this level of instability should be ignorable as compared to the economic advantage that is gained.

When the bearings are used in an evacuated region, as in most electromechanical battery (EMB) designs, the heat balance that determines the temperature of the eddy current plate 68 is primarily a balance between eddy current heating and radiation losses (assuming that the support rods 62 and 64 are made of a low conductivity material such as stainless steel). This being the case it only will take a watt or so in a typical-sized system to raise the temperature of the eddy current plate 68 by many tens of degrees Celsius. It should thus be readily possible to design the system so that in steady state the losses in eddy current plates are less than a watt. For an electromechanical battery (EMB) storing about 5 kilowatt-hours, a watt of bearing losses, taken alone, would lead to a rundown time constant on the order of 5000 hours, which would be of essentially no consequence.

Figure 4:
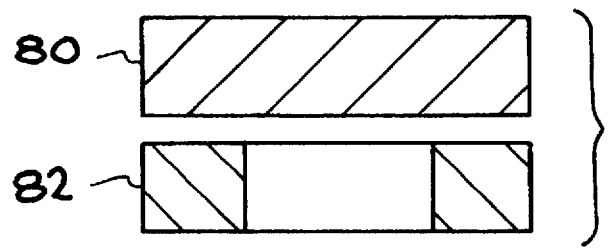
FIG. 4 shows an improved eddy-current damper for use in the embodiments of FIGS. 1-3 and 5.

FIG. 4 shows an improved version of a vibration damper for use in high-speed rotating systems, particularly ones that use magnetic bearings. In such systems it is common to use what are called "eddy-current dampers" in which a stationary conducting plate (copper, for example) 80 is located close to the surface of a rotating annular permanent magnet 82. This magnet is often an integral part of the magnetic bearing system itself. In one embodiment, an eddy current damper plate 80 is fixedly attached to a rotatable bearing element. An annular permanent magnet element 82 is fixedly attached to a stationary bearing element. Element 82 has field lines that intersect the eddy current damper plate 80. In another embodiment, eddy current damper plate 80 is fixedly attached to a stationary bearing element, and annular permanent magnet element 82 is fixedly attached to a rotatable bearing element. The eddy current damper plate 80 may have a plurality of concentric conducting rings separated by material that has a conductivity that is less than that of said conducting rings. Plate 80 may be made of a non-magnetic metal plate having deep circular grooves, where only a thin web of supporting material remains on the surface of the plate that is farthest from the annular permanent magnet element 82.

During the speed-up of the rotor, resonances may be encountered that could cause excessive lateral motions of the rotating system in the absence of damping. One such resonance is the solid-body resonance frequency associated with the mass of the rotor and the transverse compliance of the bearing system. Any residual unbalance of the rotating system comprises a periodic driving force. When the frequency of this driving force coincides with the solid-body resonance, the amplitude of the vibration may build up to unacceptable high levels unless damping means are provided. When conventional eddy-current dampers are employed, deleterious side-effects may appear, including loss-producing torques, that absorb energy from the rotor. This improved eddy-current damper assembly maximizes the desired damping effects on transversely directed vibrations, while minimizing the torque drag and other undesired effects that may be associated with the use of conventional eddy-current dampers.

The function of the circular conducting rings is to insure that the eddy currents that are induced flow only in the azimuthal direction. In the way the damping force that is exerted on the rotating magnet (when its center is displaced radially as a result of the resonance), being perpendicular to the direction of the current, is directed nearly purely radially inward, i.e., with greatly reduced accompanying torque. In this way the damper accomplishes its objective; the damping of transverse vibrations with a minimum of undesirable effects. A model of this damper has been constructed, tested and found to perform in a far superior manner to conventional eddy-current dampers.

Figure 5:
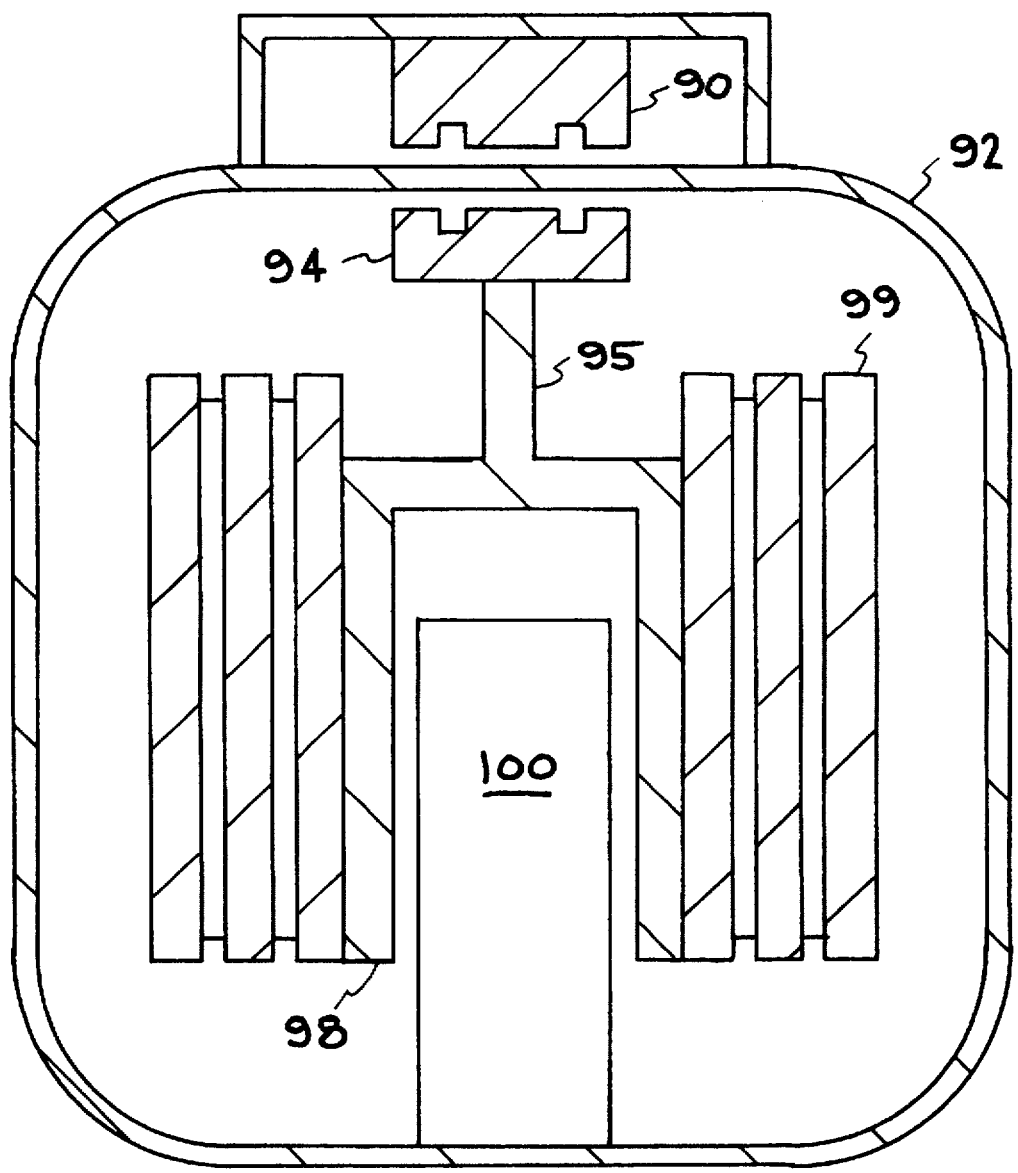
FIG. 5 shows the use of the embodiments of FIGS. 1-4 in an improved modular electromechanical battery.

FIG. 5 shows an improved version of a type of modular electromechanical battery. The purpose here is to describe a much-simplified version, one that is particularly well suited for stationary applications, where low cost, high reliability, and long service life are the critical parameters. The improved version involves a major simplification of the magnetic bearing, particularly its elements within the vacuum chamber. This change in bearing design results in an overall design that permits the simplification of all the elements of the E-M battery that operate within the vacuum housing.

Referring to FIG. 5, it can be seen that the upper, non-rotating, element 90 of the magnetic bearing exerts its attractive force through the surface of the vacuum housing 92 (which may be made of insulating material or stainless steel) on the lower, rotating element 94. This (lower) element 94 can be of very simple form, consisting only of an appropriately shaped iron (or ceramic ferrite) pole, for example as shown on the drawing, possibly with auxiliary elements. In addition, the upper elements described in FIGS. 1–3 could replace the upper element 90 outside of vacuum housing 92. The lower bearing elements described in FIGS. 1–3 would then be placed inside the vacuum housing 92 opposite their corresponding upper bearing element.

The magnetic bearings of the present invention are stable (strongly restoring) for radial displacements, but must be stabilized vertically (axially). Several options for this vertical stabilization have been described. One type includes a self-adjusting magnetic bearing system in which magnetic fields arising from a rotating multi-polar element inside the chamber (co-located with the attracted pole assembly) produce a torque on a conducting surface above the chamber wall. This torque may then actuate, either mechanically, or through a spring-loaded switch or potentiometer, electronic means that adjust the strength of the attractive pole so as to maintain vertical stability. Alternatively, an ac-activated circuit that senses the reluctance of the magnetic circuit comprised of the lower and upper poles could be employed, as a part of an electrical servo system that would maintain vertical stability.

To allow start up of the rotor, and/or to facilitate shipping of the completed unit, one or more conventional mechanical bearings that would disengage upon the lift-off of the rotor assembly at start up, should be provided. These same mechanical bearings could be used to restrain the rotor in the case of seismic events.

In FIG. 5, within the vacuum enclosure 92, the remaining rotating elements of the module are a shaft 95 connected to a rotor 96 and a cylindrical Halbach array permanent magnet assembly 98 that produce the rotating field of the generator/motor assembly 99. The vacuum housing itself consists only of the chamber 92 and the re-entrant ceramic or glass-ceramic cylinder 100 through which the rotating field is inductively coupled to the windings that lie inside cylinder 100, thus outside of the evacuated region. In this way all of the "complicated" elements of the module are both non-rotating and located outside the evacuated region, leading to a maximal simplification of the module relative to prior art designs. The design also has the virtue of removing virtually all sources of heat from the evacuated region, thus eliminating the tedious issue of providing cooling means within the chamber itself.

Changes and modifications in the specifically described embodiments can be carried out without departing from the scope of the invention, which is intended to be limited by the scope of the appended claims.

I claim:

1. A self-adjusting magnetic bearing, comprising:
   a stationary bearing element;
   a rotatable bearing element magnetically levitated by said stationary bearing element;
   wherein said self-adjusting magnetic bearing is intrinsically radially stable; and
   active means for automatically adjusting the magnetic parameters of said stationary bearing element with respect to said rotatable bearing element, resulting in axial stability, such that the force balance of said self-adjusting magnetic bearing is maintained near the point of metastable equilibrium,
   wherein said stationary bearing element comprises at least one first annular iron pole piece
   wherein said rotatable bearing element comprises at least one second annular iron pole piece fixedly attached to an annular conducting plate comprising non-magnetic material,
   wherein said at least one first annular pole piece and said at least one second annular pole piece are configured to exert magnetically attractive forces upon each other such that said rotatable bearing element tends to be pulled toward said stationary bearing element, and
   wherein said means for automatically adjusting the magnetic parameters comprises a stationary drive screw supporting an assembly comprising a magnetic shunt pair with an internal thread, each shunt of said shunt pair supporting a slotted pole.

2. The self-adjusting magnetic bearing of claim 1, wherein said annular conducting plate comprises copper.

3. The self-adjusting magnetic bearing of claim 1, further comprising:
   an eddy-current damper plate fixedly attached to said rotatable bearing element; and
   an annular permanent magnet element fixedly attached to said stationary bearing element and having field lines that intersect said eddy current damper plate.

4. The self-adjusting magnetic bearing of claim 3, wherein said eddy current damper plate comprises a plurality of concentric conducting rings separated by material having a conductivity that is less than that of said conducting rings.

5. The self-adjusting magnetic bearing of claim 3, wherein said eddy current damper plate comprises a non-magnetic metal plate having deep circular grooves, wherein only a thin web of supporting material remains on the surface of said eddy current damper plate that is farthest from said annular permanent magnet element.

6. The self-adjusting magnetic bearing of claim 1, further comprising:
   an eddy-current damper plate fixedly attached to said stationary bearing element; and
   an annular permanent magnet element fixedly attached to said rotatable bearing element and having field lines that intersect said eddy-current damper plate.

7. The self-adjusting magnetic bearing of claim 1, further comprising a vacuum enclosure, wherein said stationary bearing element is located outside said vacuum enclosure and wherein said rotatable bearing element is located inside said vacuum enclosure.

8. The self-adjusting magnetic bearing of claim 1, further comprising:
   an eddy-current damper plate fixedly attached to said rotatable bearing element; and
   an annular permanent magnet element fixedly attached to said stationary bearing element and having field lines that intersect said eddy-current damper plate.

9. The self-adjusting magnetic bearing of claim 8, wherein said eddy-current damper plate comprises a plurality of concentric conducting rings separated by material comprising with a conductivity that is less than that of said conducting rings.

10. The self-adjusting magnetic bearing of claim 8, wherein said eddy-current damper plate comprises a non-magnetic metal plate having deep circular grooves wherein only a thin web of supporting material remains on the surface farthest from said annular permanent magnet element.

11. The self-adjusting magnetic bearing of claim 1, further comprising a vacuum enclosure, wherein said stationary bearing element is located outside said vacuum enclosure and wherein said rotatable bearing element is located inside said vacuum enclosure.

12. A self-adjusting magnetic bearing, comprising:
    a stationary bearing element;
    a rotatable bearing element magnetically levitated by said stationary bearing element;
    wherein said self-adjusting magnetic bearing is intrinsically radially stable; and
    means for automatically adjusting the magnetic parameters of said stationary bearing element with respect to said rotatable bearing element, resulting in axial stability, such that the force balance of said self-adjusting magnetic bearing is maintained near the point of metastable equilibrium,
    wherein said stationary bearing element comprises:
      a cup-shaped element having a central axis; and
      an interior magnetic bearing element comprising a pole having permanent magnet material, wherein said interior magnetic bearing element is fixedly attached to said central axis of said cup shaped element,
    wherein said rotatable bearing element comprises an iron disc, and
    wherein said means for automatically adjusting the magnetic parameters comprise:
      a pole assembly detached from and located between said stationary bearing element and said rotatable bearing element, said pole assembly comprising a disc having a center iron piece and at least one alternating concentric ring of non-magnetic metal and iron, said pole assembly attached to a support structure with a spring;

means for sensing vertical displacements away from equilibrium of said rotatable bearing element; and a control coil surrounding said interior magnetic bearing element, wherein a feed-back circuit is electrically connected between said means for sensing vertical displacements and said control coil.

13. The self-adjusting magnetic bearing of claim 12, wherein said means for sensing vertical displacements comprises a strain gauge operatively connected to said spring.

14. The self-adjusting magnetic bearing of claim 13, further comprising:

an eddy-current damper plate fixedly attached to said rotatable bearing element; and an annular permanent magnet element fixedly attached to said stationary bearing element and having field lines that intersect said eddy-current damper plate.

15. The self-adjusting magnetic bearing of claim 14, wherein said eddy-current damper plate comprises a plurality of concentric conducting rings separated by material comprising with a conductivity that is less than that of said conducting rings.

16. The self-adjusting magnetic bearing of claim 14, wherein said eddy-current damper plate comprises a non-magnetic metal plate having deep circular grooves wherein only a thin web of supporting material remains on the surface farthest from said annular permanent magnet element.

17. The self-adjusting magnetic bearing of claim 14, wherein said eddy current damper plate comprises a plurality of concentric conducting rings separated by material having a conductivity that is less than that of said conducting rings.

18. The self-adjusting magnetic bearing of claim 14, wherein said eddy current damper plate comprises a non-magnetic metal plate having deep circular grooves, wherein only a thin web of supporting material remains on the surface of said eddy current damper plate that is farthest from said annular permanent magnet element.

19. The self-adjusting magnetic bearing of claim 13, further comprising a vacuum enclosure, wherein said stationary bearing element is located outside said vacuum enclosure and wherein said rotatable bearing element is located inside said vacuum enclosure.

20. The self-adjusting magnetic bearing of claim 13, further comprising:

an eddy-current damper plate fixedly attached to said stationary bearing element; and an annular permanent magnet element fixedly attached to said rotatable bearing element and having field lines that intersect said eddy-current damper plate.

21. A self-adjusting magnetic bearing, comprising:

a stationary bearing element;

a rotatable bearing element magnetically levitated by said stationary bearing element;

wherein said self-adjusting magnetic bearing is intrinsically radially stable; and means for automatically adjusting the magnetic parameters of said stationary bearing element with respect to said rotatable bearing element, resulting in axial stability, such that the force balance of said self-adjusting magnetic bearing is maintained near the point of metastable equilibrium, wherein said stationary element comprises:

a first cup-shaped element comprising magnetically conducting material and having a first central axis;

a second cup-shaped element comprising magnetically conducting material and having a second central axis;

a permanent magnet piece fixedly connected to said first central axis and said second central axis to fixedly connect said first cup to said second cup;

a third cup-shaped element comprising a third central axis, said third cup shaped element comprising magnetically conducting material and non-magnetic metallic material with at least two through holes; and a copper eddy current plate supported by two support rods that extend from said copper eddy current plate through said at least two through holes and are fixedly attached to said second cup shaped element;

wherein said rotatable bearing element comprises:

an eddy-current exciter; and a pole assembly fixedly attached to said eddy current exciter;

wherein said means for automatically adjusting the magnetic parameters comprise a thermostat element fixedly supported between said copper eddy current plate and said non-magnetic metallic material of said third cup shaped element.

22. The self-adjusting magnetic bearing of claim 21, wherein said eddy-current exciter comprises a slotted pole.

23. The self-adjusting magnetic bearing of claim 22, further comprising at least one tension spring fixedly attached between said third cup shaped element and said eddy current plate.

24. The self-adjusting magnetic bearing of claim 21, wherein said eddy-current exciter comprises a planar Halbach array.

25. The self-adjusting magnetic bearing of claim 21, wherein said thermostat element is selected from a group consisting of a sealed sylphon bellows and an assembly comprising a bimetallic element, wherein said sealed sylphon bellows comprises a vaporizable liquid.

26. The self-adjusting magnetic bearing of claim 21, further comprising:

an eddy-current damper plate fixedly attached to said rotatable bearing element; and an annular permanent magnet element fixedly attached to said stationary bearing element and having field lines that intersect said eddy-current damper plate.

27. The self-adjusting magnetic bearing of claim 26, wherein said eddy-current damper plate comprises a plurality of concentric conducting rings separated by material comprising with a conductivity that is less than that of said conducting rings.

28. The self-adjusting magnetic bearing of claim 26, wherein said eddy current damper plate comprises a non-magnetic metal plate having deep circular grooves wherein only a thin web of supporting material remains on the surface farthest from said annular permanent magnet element.

29. The self-adjusting magnetic bearing of claim 21, further comprising a vacuum enclosure, wherein said stationary bearing element is located outside said vacuum enclosure and wherein said rotatable bearing element is located inside said vacuum enclosure.

30. The self-adjusting magnetic bearing of claim 21, further comprising:

an eddy-current damper plate fixedly attached to said stationary bearing element; and an annular permanent magnet element fixedly attached to said rotatable bearing element and having field lines that intersect said eddy-current damper plate.

* * * * *